United States Patent
Bavard et al.

(10) Patent No.: US 9,487,091 B2
(45) Date of Patent: Nov. 8, 2016

(54) METHOD OF ADJUSTING POWER ABSORBED BY AT LEAST ONE ELECTRICALLY POWERED VEHICLE

(75) Inventors: Xavier Bavard, Bailleulval (FR); Eric Chattot, Meudon (FR); Said El Fassi, Vigneux sur Seine (FR); Jean-Noel Verhille, Oignies (FR)

(73) Assignee: Siemens S.A.S., Sanit-Denis (FR)

( * ) Notice: Subject to any disclaimer, the term of this patent is extended or adjusted under 35 U.S.C. 154(b) by 646 days.

(21) Appl. No.: 13/997,358

(22) PCT Filed: Sep. 15, 2011

(86) PCT No.: PCT/EP2011/066037
§ 371 (c)(1),
(2), (4) Date: Jun. 24, 2013

(87) PCT Pub. No.: WO2012/084282
PCT Pub. Date: Jun. 28, 2012

(65) Prior Publication Data
US 2013/0270904 A1 Oct. 17, 2013

(30) Foreign Application Priority Data
Dec. 23, 2010 (EP) .................................. 10290675

(51) Int. Cl.
*B60L 3/00* (2006.01)
*B60L 9/00* (2006.01)
(Continued)

(52) U.S. Cl.
CPC .. *B60L 9/00* (2013.01); *B60L 7/18* (2013.01); *B60L 9/005* (2013.01); *B60L 11/005* (2013.01); *B60L 11/1816* (2013.01);
(Continued)

(58) Field of Classification Search
USPC ......................................................... 307/9.1
See application file for complete search history.

(56) References Cited

U.S. PATENT DOCUMENTS 8,729,728 B2 * 5/2014 Bavard .................... B60M 3/06
105/49
2003/0230994 A1 12/2003 Seddiki et al.
(Continued)

FOREIGN PATENT DOCUMENTS

CN 101516670 A 8/2009
EP 1359049 A1 11/2003
(Continued)

OTHER PUBLICATIONS

Reiner, K., "Einsatzmöglichkeiten für Energiespeicher im elektrischen Bahnbetrieb", Elektrische Bahnen, 1993; pp. 331-335; vol. 91, No. 10; Oldenbourg Industrieverlag, München, DE.

*Primary Examiner* — Rexford Barnie
*Assistant Examiner* — Dru Parries
(74) *Attorney, Agent, or Firm* — Laurence Greenberg Werner Stemer; Ralph Locher

(57) ABSTRACT

A method of adjusting the power absorbed by at least one vehicle powered by at least one electrical energy storage unit and one electrical network on the ground providing the vehicle with at least one inrush current necessary for starting up the vehicle, includes adjusting the inrush current, before and at least during the starting-up of the vehicle, to a constant mean value and keeping variations of the inrush current around the mean value to a minimum by controlling at least one variable supply of compensating energy from the energy storage unit of the vehicle. A computer for implementing the method is also provided.

13 Claims, 2 Drawing Sheets

(51) Int. Cl.
*H02J 1/14* (2006.01)
*H02J 3/28* (2006.01)
*H02J 3/32* (2006.01)
*H02J 7/34* (2006.01)
*B60L 7/18* (2006.01)
*B60L 11/00* (2006.01)
*B60L 11/18* (2006.01)

(52) U.S. Cl.
CPC ....... *B60L 11/1842* (2013.01); *B60L 11/1844* (2013.01); *B60L 11/1846* (2013.01); *H02J 1/14* (2013.01); *H02J 3/28* (2013.01); *H02J 3/32* (2013.01); *H02J 7/34* (2013.01); *B60L 2200/18* (2013.01); *B60L 2200/26* (2013.01); *B60L 2240/12* (2013.01); *B60L 2260/32* (2013.01); *Y02E 60/721* (2013.01); *Y02T 10/7005* (2013.01); *Y02T 10/7022* (2013.01); *Y02T 10/7072* (2013.01); *Y02T 10/92* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

2007/0278059 A1* 12/2007 Afriat ................ B60L 11/1801
                                                       191/29 R
2011/0095604 A1    4/2011 Bavard et al.

FOREIGN PATENT DOCUMENTS

| JP | 2000203316 A | 7/2000 |
| WO | 2005082666 A1 | 9/2005 |
| WO | 2009153416 A1 | 12/2009 |

* cited by examiner

METHOD OF ADJUSTING POWER ABSORBED BY AT LEAST ONE ELECTRICALLY POWERED VEHICLE

BACKGROUND OF THE INVENTION

Field of the Invention

The present invention principally relates to a method of adjusting power absorbed by at least one electrically powered vehicle, powered by at least one electrical energy storage unit and one electrical network on the ground providing the vehicle with at least one inrush current necessary for starting up the vehicle. The invention also relates to an associated computer.

Systems for supplying traction power to a metro line or other forms of public transport (trams, trolleybuses, guided buses, trains, self-guided (driverless) vehicles, etc.) are subjected to power fluctuations which principally depend on the number of vehicles on the line, in addition to the synchronism thereof. The power consumption, which increases with the number of vehicles, is not constant and is highly dependent on the operating phases (acceleration, speed level, deceleration) of the vehicles. These rapid variations in power cause power surges from the fixed installations. Said power surges have a significant effect on the quality of the distribution of power to the line but also on line losses which increase and which affect the overall energy efficiency of a public transport network. It should also be noted that, in many cases, these surges result in contractual penalties with an energy supplier.

Taking the example of a metro line, the dimensioning of the installations for the distribution of energy to the line, calculated for the maximum capacity of the number of vehicles, permits the use of the line in all operating modes (peak hours and off-peak hours). The dimensioning of said installations has to take into account power surges so as to guarantee the availability and reliability of the transport network. To remedy the drop in quality of the distribution of energy by the supply rails, "feeders" are generally installed at intervals along the line to limit excessive voltage drops, in addition to line losses. As regards a contractual engagement with the energy supplier, two solutions currently exist to remedy the aforementioned problems:
1) service contract with the supplier which has been over-specified, but this is more expensive
2) service contract with the supplier which has been specified as closely as possible but a penalty is applicable when excessive power is drawn.

These contractual requirements, in the face of performance obligations, constitute a dilemma which is difficult to resolve. In both cases, overconsumption has taken place, resulting in an inevitable environmental drawback regarding overall measures to reduce the energy requirement.

BRIEF SUMMARY OF THE INVENTION

An object of the present invention is to propose a method which aims to minimize high power surges which are absorbed in the event of a demand for current from at least one vehicle. At the same time, the object is also to be able to respect a consumption framework so as to adhere to the conditions of an energy supplier and thus also of the environment by avoiding the overconsumption of energy.

Such a method is set forth by the following features:
Proceeding from a method of adjusting power absorbed by at least one vehicle, powered by at least:
one electrical energy storage unit,
one electrical network on the ground, providing the vehicle with at least one inrush current which is necessary for starting up the vehicle,
the invention provides that before and at least during the starting-up of the vehicle, the inrush current is adjusted to a constant mean value and variations of said inrush current around the mean value are kept to a minimum by controlling at least one variable supply of compensating energy from the energy storage unit of said vehicle.

The constant mean value is set below a maximum consumption threshold permitted by a supplier. Any demand for current requiring said threshold to be exceeded, such as in the form of a power surge, is thus advantageously compensated by the variable supply of energy which is capable of providing energy to the vehicle entirely independently of the electrical network associated with the supplier. As a result, the contractual and physical conditions of a supplier are respected and, by adapting the threshold to remain below a minimum level by maximizing the variable supply, this results in energy savings which are beneficial for the manager of a public transport company as well as the environment.

A set of sub-claims also sets forth the advantages of the invention.

Several advantageous means exist for implementing the method according to the invention which may be used dynamically by being combined in a linear manner, as a function of the instant energy storage state thereof, including:
the energy storage unit delivers energy to the vehicle from a structure on the ground: for example, in this case the required variable supply is adjusted to complement the constant inrush current delivered by the supplier by means of energy storage units at the station, for example provided with supercapacitors or other rechargeable batteries (during off-peak hours).
the energy storage unit is installed in at least one vehicle: more specifically, it is possible to release the variable energy supply if surplus energy is stored, for example in a supercapacitor or an onboard battery. More specifically, it is also known that many types of vehicle currently comprise an onboard storage device (bus, tram, metro, etc.) and this feature makes the method according to the invention advantageously applicable by delivering energy to the vehicle itself.

Ideally, the energy storage unit stores and delivers energy by means of an element of high capacitance, such as at least one supercapacitor. This type of storage is perfectly capable of delivering energy in the form of a power surge and has the advantage of also being rechargeable over a short period of time and at high power but also over a longer period of time without requiring high power, thus during off-peak hours where the potential consumption of energy for the recharging process (for example from the supplier network) may be more economical.

In addition, the energy storage unit is able to be recharged by recovering energy from at least one of the following sources:
the vehicle, ideally during braking;
the electrical network on the ground, outside a starting-up phase of the vehicle, ideally in off-peak traffic hours.

This recharging process which is predictive, therefore, is provided in order to be able to meet subsequent very high demands for current, subject to power surges.

In order to be able to determine the mean constant value required, in addition to the associated and available variable energy supply, the energy storage unit is advantageously controlled by an algorithm (in the form of a computer) for dimensioning the level of energy required, taking into account a traffic plan for a plurality of vehicles, the minimum possible level of the mean inrush current value and the resources for the variable energy supply and, if available, a set of complementary energy storage units, in an ideal case said set naturally being separate from a simultaneous supply from the supplier.

By way of a very advantageous example, the set of complementary energy storage units may comprise a flexible number of storage units installed in vehicles which are stationary or even parked in a garage/maintenance/delivery area, in particular during off-peak traffic hours. Said units which are "passive relative to the traffic" thus make it possible to provide at least one contribution to the variable energy supply (for power surges) required from the "active" public transport network (via rails/overhead contact lines).

Said dimensioning algorithm ideally follows a logic to minimize a power surge from the electrical network on the ground, by compensating for said surges by variable supplies of energy distributed by at least one energy storage unit, in particular when starting up vehicles. According to this principle, the dimensioning algorithm follows a logic for minimizing the mean value of the inrush current, at least to maintain said value equal to or less than a target threshold for energy consumption set by a distributor of the electrical network on the ground. The more the algorithm detects sources capable of contributing to maximizing the variable supply, the more it succeeds in advantageously minimizing the target threshold of the mean inrush current value, subject to one or more sudden power surges.

Finally, the invention provides a computer to implement the method comprising a module for determining the inrush current around a mean value imposed by the electrical network on the ground and a module for controlling the variations set for the storage levels and delivery of energy from at least one energy storage unit in order to be able to adjust the variable supply which is potentially available for an expected power surge. Said computer is an ideal medium for implementing the aforementioned dimensioning algorithm, resulting in the required compensation of power surges, whilst limiting the demand for current to an acceptable threshold value.

It is possible to provide that the module for determining and the module for controlling are installed, in particular, in public transport applications, the vehicles thereof having their own communication means and interacting with one another and/or via a communication network on the ground. Thus, a set of vehicles on a metro line having an available onboard energy resource is thus able to respond to the variable supply required in the event of a demand for current by one of the vehicles. During a period of time which is free of frequent power surges, said vehicles attempt to recharge (autonomously or from the supplier network within the maximum permitted consumption limit) their onboard storage unit in order to be able to anticipate the next demand for current, subject to a power surge. To profit from every available resource in the vehicle/on the ground and to permit recharging/discharging commands to be transmitted, the computer is thus simply able to be connected to an interface for communication between the ground and the vehicle.

To implement the method according to the invention, energy storage systems via supercapacitors currently represent very promising solutions, not only as complementary elements to non-reversible sub-stations but also actively compensating for voltage drops, which generate current surges at sensitive parts of the supply networks.

A first approach for such a system is thus to arrange at sensitive locations on the line (generally at the end of the line) a sub-station with an energy storage base, to compensate for ohmic voltage drops (characteristic of continuous current supply systems) and to provide recovery from the electric braking of the vehicles in all operating modes (even in off-peak hours). This solution has the principal advantage of withstanding current surges in the storage units on the ground. This results in a redimensioning of the supply on the ground (transformer and rectifier) adapted to a mean power level. This type of solution, whilst improving the overall performance of the line, in particular the electrical braking, does not prevent demands for current associated with the start-up of vehicles. The voltage drops in the feeder bars of the line caused thereby may thus result in the installation of one or more devices incorporating storage units on the ground in order to monitor the voltage delivered by the distribution rails at different sensitive points on the line.

The second approach for such a system which comprises onboard storage units may seem complementary to the first approach but nevertheless seems more attractive in many ways. By its capacity for onboard storage ("energy" storage is implicit) it has the advantage of providing the additional energy which is inherent in the start-up phase of a set of metro carriages, for example. In these conditions, current surges are no longer borne by the distribution rails but the equipment for controlling the onboard storage units. Voltage drops in the distribution rails are thus reduced and the addition of feeders is now no longer imperative. A further feature relates to the independent energy supply, due to the onboard storage equipment, which the first approach does not permit. Each onboard storage resource, dedicated to the traction equipment of the vehicle, thus provides the complementary energy associated with each start-up of the vehicle which does not exclude in any way the possibility of providing energy to a different vehicle. In the first case (storage on the ground), the operation of N vehicles may result in a current surge which is equal to N times that of a vehicle, provided the vehicles are synchronized. In the second approach, the current surges borne by the line do not exist, irrespective of the number of vehicles on the line (whether synchronized or not) which is very advantageous for the dimensioning and the performance of the system. The dimensioning of the equipment on the ground is thus carried out on the basis of the mean consumption multiplied by the number of vehicles.

The onboard storage devices comprise electrical convertors and, as a result, produce a highly flexible operation. Different control strategies may be implemented in order to optimize the energy consumption of each vehicle and thus eliminate the power surges borne by the fixed installations. In these conditions, the line losses are considerably reduced and no longer require the addition of feeders. A further feature relates to maintaining the voltage of the supply rails which, by eliminating the current surges, makes it possible to obtain improved performance. All these reasons mean that the installations for providing energy no longer have to be overdimensioned. The elimination of power surges is based on an algorithm for dimensioning and controlling the onboard storage units, which for each inter-station, results in a constant absorbed power in the case of a demand for current. The onboard storage units from now on cater for the complementary energy (variable adjusted supply) in order to satisfy the operating phases associated with how the vehicle travels (acceleration, speed level and deceleration) and which require fluctuating instant power.

BRIEF DESCRIPTION OF THE SEVERAL VIEWS OF THE DRAWING

Exemplary embodiments and applications are provided with reference to the described figures, in which.

DESCRIPTION OF THE INVENTION

Figure 1A:
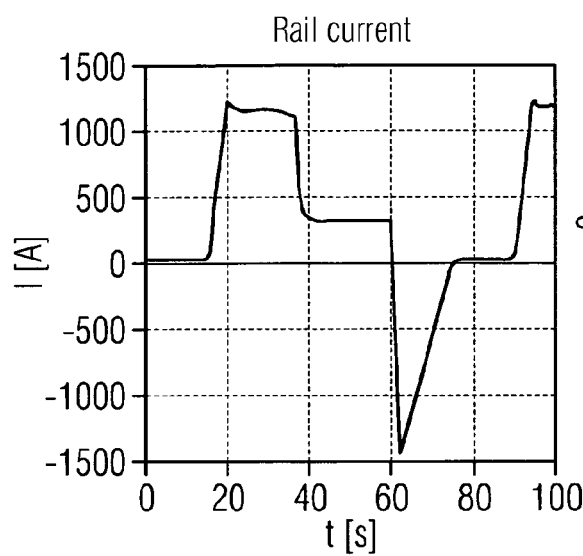
FIGS. 1A, 1B: are an example of a power surge in the prior art.
Figure 1B:
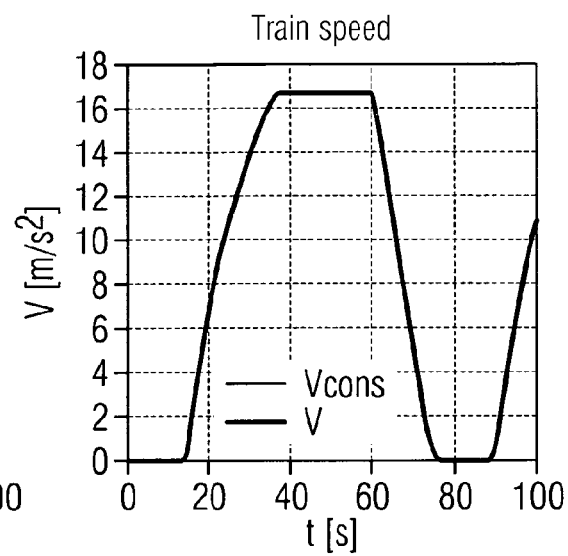

FIG. 1A shows a current profile I (A) required and absorbed by a vehicle moving as a function of the time t(s). FIG. 1B shows an associated speed profile V(m/s) of said vehicle as a function of the time t(s). The method according to the invention has not been applied to these two simulations.

The results of these two simulations clearly illustrate the demand for current which a sub-station has to deliver (FIG. 1.a). This demand exists during the entire start-up phase of the vehicle (principally when starting up the vehicle between t=0s and t=40s). Equipment for supplying energy from sub-stations has to be dimensioned to withstand this type of overload, given that that several vehicles may start up at the same time. This demand for current, moreover, impairs the quality of the distribution of energy, as it causes voltage drops in the busbars. In conclusion, the demand for current requires the installations (sub-stations) to be overdimensioned and the implementation of possible feeders when the voltage drops in the busbars are too great. These two aspects thus increase the costs of installing and controlling a public transport line.

Figure 2A:
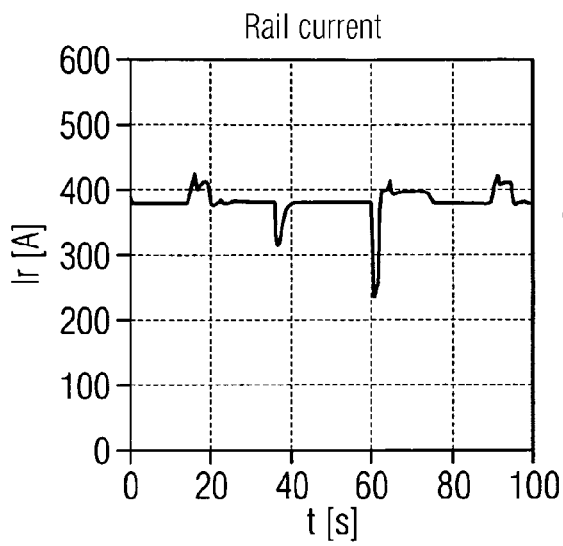
FIGS. 2A, 2B, 2C, 2D: are an example of implementing the method according to the invention.
Figure 2B:
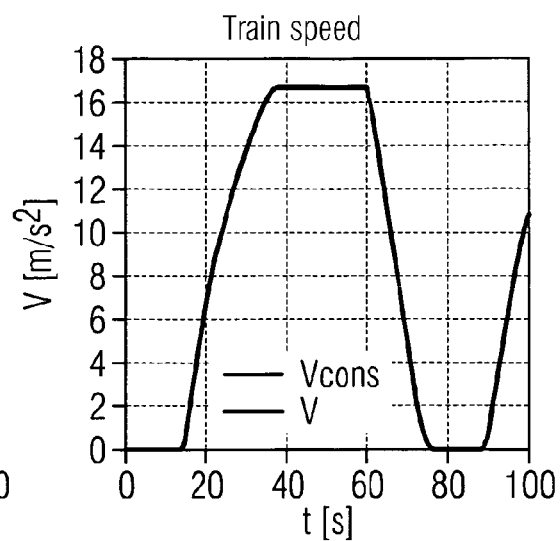
Figure 2C:
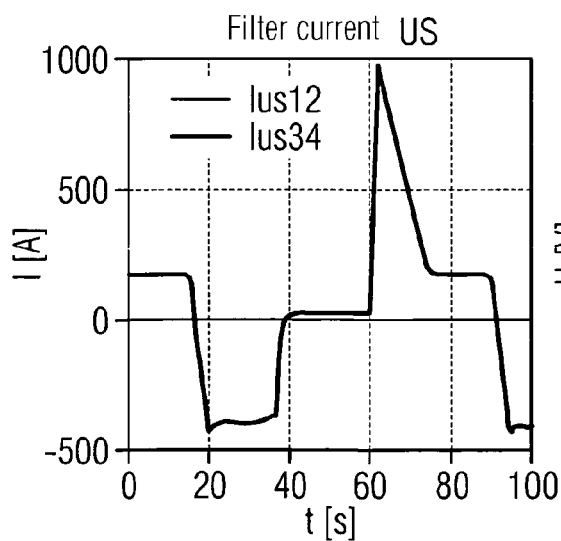
Figure 2D:
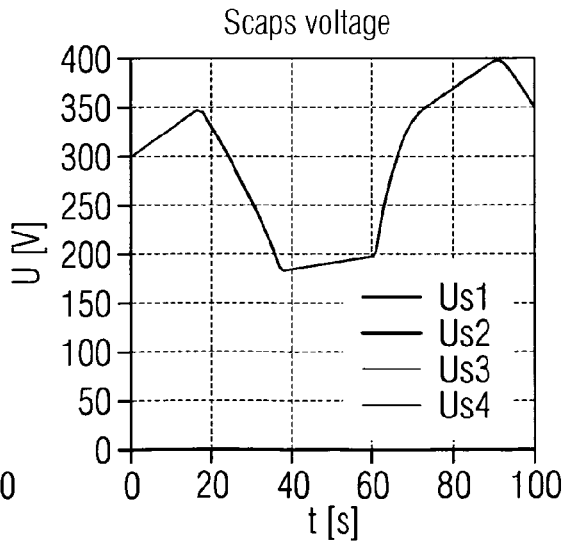

FIG. 2A shows a current profile I (A) which is required and absorbed by the same vehicle moving as a function of the time t(s). FIG. 1B shows an associated speed profile (V(m/s) of said vehicle as a function of the time t(s). The method according to the invention has been applied to this set of new simulations. To illustrate this, FIG. 2C shows the contribution in the form of a variable supply of energy (in addition to the constant mean value—approximately 385 A—of FIG. 2A) from the energy storage unit (in this case installed as a supercapacitor). To summarize, a negative current implies the provision of energy from the onboard storage unit (between t=18 and 40s); a positive current confirms the recharging of the onboard storage units (between t=0 and 18s and between t=60 and 70s).

The simulation shows that the current delivered by the feeder rails (FIG. 2A), allowing for the transient state, is constant (385 A). The requirements associated with the propulsion of the vehicle (FIG. 2B) are provided, as a complement to those delivered by the rails (supplier network), by the onboard storage units (FIG. 2C). The start-up (starting up) of the vehicle is accompanied by a demand for current which on this occasion is borne by the installed storage units (FIG. 2C, between t=18 and 40s). As the calculation algorithm imposes a demand for current for adjusting to a fixed mean value absorbed by the vehicle (rail/supplier current), a variable additional current provided by the installed storage units follows. In these conditions, the dimensioning of the substations no longer has to take into account the demand for current (constant current in the rails). Similarly, the possible installation of feeders is no longer necessary for the correct operation of the system.

FIG. 1D finally shows a "scaps" voltage of an onboard storage unit providing the variable energy supply.

The invention claimed is:

1. A method of adjusting power absorbed by at least one vehicle, the method comprising the following steps:
    powering the vehicle at least with one electrical energy storage unit and an electrical network on the ground providing the vehicle with at least one inrush current necessary for starting up the vehicle;
    adjusting the at least one inrush current, before and at least during a start-up of the vehicle, to a constant mean value;
    keeping variations of the at least one inrush current around a mean value to a minimum by controlling at least one variable supply of compensating energy from the electrical energy storage unit of the vehicle;
    controlling the electrical energy storage unit by an algorithm for dimensioning an energy requirement, taking into account a traffic plan for a plurality of vehicles, the mean value of the at least one inrush current and, if available, a set of complementary energy storage units; and
    providing the set of complementary energy storage units as a flexible number of storage units installed in vehicles which are stationary or parked in a garage area.

2. The method according to claim 1, which further comprises delivering energy from a structure on the ground to the vehicle using the electrical energy storage unit.

3. The method according to claim 1, which further comprises recharging the electrical energy storage unit by recovering energy from at least one of the following sources:
    the vehicle, ideally during braking thereof; or
    the electrical network on the ground, outside a start-up phase of the vehicle.

4. The method according to claim 1, which further comprises storing and delivering energy with the electrical energy storage unit using a high capacitance element.

5. The method according to claim 4, which further comprises providing at least one supercapacitor as the high capacitance element.

6. The method according to claim 1, wherein the storage units are installed in the vehicles which are stationary or parked in the garage area during off-peak traffic hours.

7. The method according to claim 1, which further comprises causing the dimensioning algorithm to follow a logic to minimize a power surge from the electrical network on the ground, by compensating for surges by a supply of energy distributed by at least one energy storage unit.

8. The method according to claim 1, which further comprises causing the dimensioning algorithm to follow a logic to minimize a power surge from the electrical network on the ground, by compensating for surges by a supply of energy distributed by at least one energy storage unit when starting up vehicles.

9. The method according to claim 1, which further comprises causing the dimensioning algorithm to follow a logic for minimizing the mean value of the at least one inrush current, at least to maintain a value equal to or less than a target threshold for energy consumption set by a distributor of the electrical network on the ground.

10. A computer for implementing a method according to claim 1 of adjusting power absorbed by at least one vehicle, the computer comprising:
    a module configured to determine the at least one inrush current around a mean value imposed by the electrical network on the ground; and a module configured to control variations set for storage levels and a delivery of energy from the at least one energy storage unit installed on the at least one vehicle and providing energy for start-up of the at least one vehicle.

11. The computer according to claim 10, wherein said module configured to determine the at least one inrush current and the module configured to control variations are installed on board the vehicle.

12. The computer according to claim 10, which further comprises an interface connected to the computer and configured to communicate between the ground and the vehicle.

13. The method according to claim 1, wherein the electrical energy storage unit is installed on at least one vehicle.

* * * * *